May 25, 1926.
A. W. WINTERBORNE
1,586,136
MEANS FOR CONNECTING AND OPERATING SHAFTS
Original Filed March 12, 1920
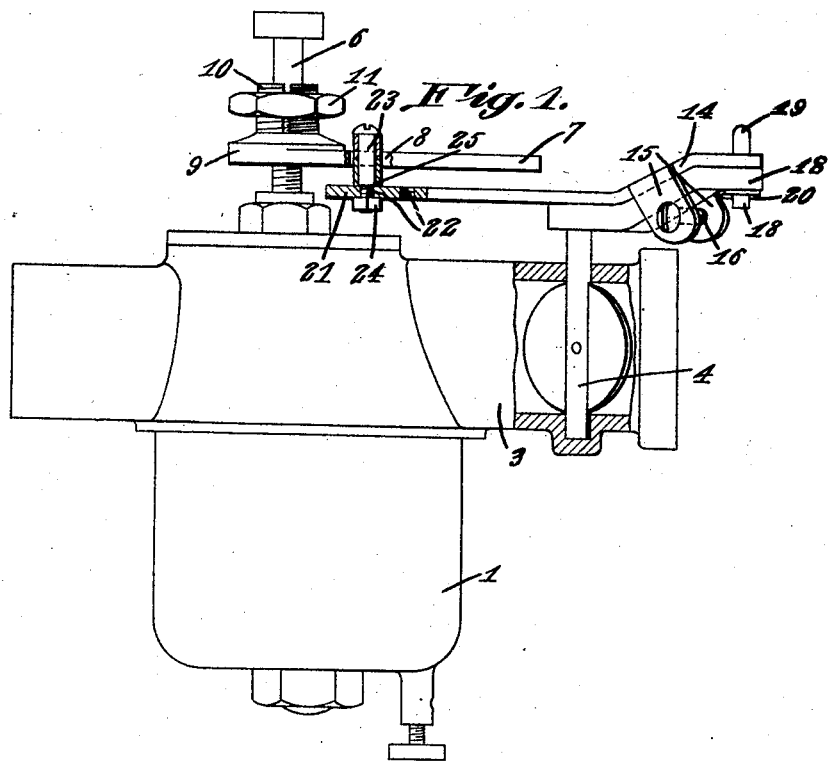
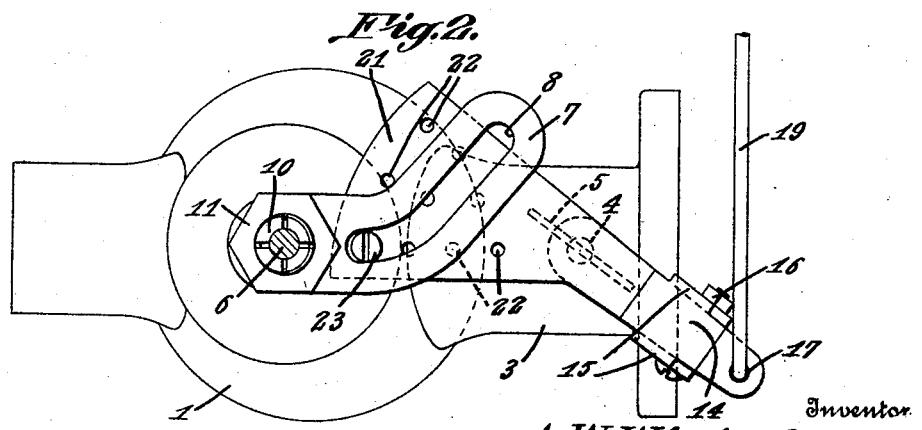

Patented May 25, 1926.

1,586,136

UNITED STATES PATENT OFFICE.

ARTHUR WILLIAM WINTERBORNE, OF SAN ANTONIO, TEXAS.

MEANS FOR CONNECTING AND OPERATING SHAFTS.

Application filed March 12, 1920, Serial No. 365,213. Renewed October 30, 1925.

Specifically, the device forming the subject matter of this application recognizes two problems and aims to solve the same, first, by providing novel means for transmitting motion to a member on the needle valve of a carbureter, from a member on the crank of the valve which controls the passage of the mixture from the carbureter; and, secondly, to provide novel means for holding the last specified member on the crank, without altering the construction of the crank, boring holes therein, or changing the connection between the crank and the rod whereby the crank is manipulated.

In the accompanying drawings:—

Figure 1 shows in side elevation, a device embodying the improvements hereinafter claimed, parts being broken away; Figure 2 is a top plan of the structure shown in Figure 1.

Referring to the drawings, there is shown a support 1 having an extension 3 wherein is journaled a first shaft 4, the shaft being supplied with a crank 12. A second shaft 6 is threaded into the support 1.

The numeral 7 denotes a first arm having an angular guide slot 8, the arm terminating in an enlarged head 9 mounted on the shaft 6, the part 9 having a slit sleeve 10 of tapered construction, clamped on the shaft 6 by a nut 11.

The numeral 14 denotes a second arm superposed on the crank 12 and provided with depending ears 15 through which passes a tightening device, such as a bolt 16, the ears 15 and the bolt 16 constituting a clamp adapted to hold the arm 14 on the crank 12. The arm 14 and the crank 12 are provided with cooperating openings 17 adapted to receive a finger 18 of an operating rod 19, there being a pin 20 extended through the finger to hold the finger in the openings 17. The arm 14 terminates in an enlarged head 21 having a plurality of openings 22, in any one of which may be mounted a projection preferably in the form of a stud 23 held in place by a nut 24 and carrying a roller 25 adapted to move in the angular guide slot 8 of the arm 7.

It will be obvious that when the shaft 4 is operated through the instrumentality of the crank 12 and the member 19, a swinging movement will, at the same time, be imparted to the arm 14. The roller 25 on the arm 14, moving in the slot 8 of the arm 7, will swing the said arm, rotation being imparted to the shaft 6.

Having thus described the invention, what is claimed is:—

The combination with a support, and shafts journaled therein, of means for connecting and operating the shafts, said means comprising first and second arms overlapped at their inner ends, one arm having a slot, and the other arm having a projection movable in the slot, the first arm having a split sleeve receiving one shaft, a nut on the sleeve and clamping the same on said shaft, the other shaft being provided with a crank, and the second arm being superposed on the crank, the second arm and the crank having alined openings, the second arm being provided with ears located on opposite sides of the crank, a tightening device connecting the ears, and an operating member including a finger received in the openings of the crank and the second arm.

In testimony that I claim the foregoing as my own, I have hereto affixed my signature.

ARTHUR WILLIAM WINTERBORNE.